United States Patent
Birgen et al.

(10) Patent No.: US 11,560,119 B1
(45) Date of Patent: Jan. 24, 2023

(54) PREGNANCY SEAT BELT OR SAFETY HARNESS

(71) Applicants: Bill Birgen, Tempe, AZ (US); Wes Cross, San Diego, CA (US)

(72) Inventors: Bill Birgen, Tempe, AZ (US); Wes Cross, San Diego, CA (US)

(*) Notice: Subject to any disclaimer, the term of this patent is extended or adjusted under 35 U.S.C. 154(b) by 0 days.

(21) Appl. No.: 17/302,544

(22) Filed: May 5, 2021

Related U.S. Application Data

(60) Provisional application No. 63/020,161, filed on May 5, 2020.

(51) Int. Cl.
*B60R 22/00* (2006.01)
*B60R 22/12* (2006.01)

(52) U.S. Cl.
CPC ............ *B60R 22/001* (2013.01); *B60R 22/12* (2013.01); *B60R 2022/008* (2013.01)

(58) Field of Classification Search
CPC ...... B60R 2022/008; B60R 2021/0062; B60R 22/001; B60R 2021/0053; B60R 22/26; B60R 22/00; A62B 35/0006
See application file for complete search history.

(56) References Cited

U.S. PATENT DOCUMENTS

| 5,624,136 | A | * | 4/1997 | McGlothlin | ............ B60R 22/02 280/801.1 |
| 6,871,360 | B1 | * | 3/2005 | Ashline | ................ A42B 3/0473 2/468 |
| 2002/0140279 | A1 | * | 10/2002 | Arditi | ..................... B60R 22/02 297/485 |
| 2002/0145279 | A1 | * | 10/2002 | Murray | ................. B60R 22/105 280/801.1 |
| 2005/0015859 | A1 | * | 1/2005 | Ashline | ................. B60R 22/001 2/421 |
| 2019/0283704 | A1 | * | 9/2019 | Hainsworth | ............ B60R 22/14 |

FOREIGN PATENT DOCUMENTS

| CN | 202038266 U | * | 11/2011 | |
| EP | 1344552 A1 | * | 9/2003 | ......... A62B 35/0025 |
| GB | 2373762 A | * | 10/2002 | ............ B60R 22/02 |
| JP | 2005324755 A | * | 11/2005 | |
| WO | WO-2009061232 A1 | * | 5/2009 | ........... B60R 22/023 |

* cited by examiner

*Primary Examiner* — Paul N Dickson
*Assistant Examiner* — Matthew D Lee
(74) *Attorney, Agent, or Firm* — Venjuris P.C.

(57) ABSTRACT

A pregnancy seat belt that secures an expectant mother and her unborn baby due to the absence of a lap belt traversing the expectant mother's abdomen. The expectant mother is secured instead by a center belt and/or thigh-belts that secure the mother at her thighs and avoid traverse of her abdomen.

6 Claims, 7 Drawing Sheets

PREGNANCY SEAT BELT OR SAFETY HARNESS

FIELD OF THE INVENTION

The present invention relates to safety harnesses, and in particular safety belts for expectant mothers.

BACKGROUND OF THE INVENTION

Prior art seat belts in automobiles are typically comprised of a shoulder restraint 9 and a lap belt restraint 1. While ubiquitous, the prior art design, and particularly the lap belt restraint 1 may cause serious injury or death to the unborn baby 8 of an expectant mother 10 in the event of a sudden deceleration of the vehicle thereby causing the unborn baby 8 to suffer a crushing effect of the mother's weight against lap belt restraint 1 as illustrated in FIG. 1. There is a need in the art for an improved seat belt for expectant mothers.

SUMMARY OF THE INVENTION

Aspects of the disclosure may be adapted to a pregnancy seat belt that may be coupled to a vehicle's existing lap belt restraint. The pregnancy seat belt safely secures an expectant mother and her unborn baby due to the absence of a lap belt restraint traversing the mother's abdomen. Instead, the expectant mother is secured by a center belt and thigh-belts that avoid the expectant mother's abdomen. The aspects taught herein may be adapted to gurneys, backboards, stretchers, planes, helicopters, and boats; i.e., any application where a lap belt across a pregnant woman's abdomen may harm the unborn baby Aspects may be incorporated into pregnancy seat belt comprised of a length of seat belt strap material with a seat belt buckle on each end of the length and left and right thigh-belts that each have a loop on first ends and a latch-plate on the second end. The length of seat belt strap material and the left and right thigh-belts are securable to a lap belt restraint of an existing seat belt installed in a vehicle and the latch-plates are securable to the seat belt buckles over the thighs of an expectant mother. As on example, the length of seat belt strap material is securable to the lap belt restraint by looping it around the lap belt restraint and the thigh-belts are securable with knots that include the loops in the first ends of the thigh-belts. In another aspect, the center belt may be omitted in favor of left and right T-shaped garters of seat belt strap material, wherein the T-shaped garters have a center segment with a loop on a first end of the center segment, and that intersects a thigh-loop segment at a second end of the center segment, the thigh-loop segments with a seat belt buckle and a latch-plate at opposite respective ends. In another aspect, the pregnancy seat belt may include a U-shaped double seat belt buckle center belt of seat belt strap material, with a seat belt buckle on each end of the U-shaped double seat belt buckle center belt and left and right thigh-straps with loops at the first ends and latch plates at second ends of the left and right thigh-straps. In use, the U-shaped double seat belt buckle center belt is securable by a knot to a lap belt restraint and the left and right thigh-straps are securable to the lap belt restraint by the loops. Moreover, the U-shaped seat belt buckle center belt may be pulled up between the thighs of an expectant mother and the latch plates of the left and right thigh-straps are securable to each of the seat belt buckles of the U-shaped double seat belt buckle center belt. In another aspect, the U-shaped double seat belt buckle center belt has a loop at a middle portion of the U-shaped double seat belt buckle center belt and the loop at the middle segment of the U-shaped double seat belt buckle center belt is securable to a lap belt restraint.

Numerous advantages and features of the present invention will become readily apparent from the following detailed description of the invention and the embodiments thereof, from the claims and from the accompanying drawings.

DESCRIPTION OF PREFERRED EMBODIMENTS

The figures illustrate several embodiments of a pregnancy seat belt incorporating aspects of the invention. The aspects of the invention disclosed may scaled or modified for any and all sizes of people or seat sizes and applications. It is also contemplated that aspects of the disclosure can be incorporated into a seat belt for any type of vehicle including but not limited to automobiles, boats, planes and trains, or into a safety harness for any and all rescue equipment. Accordingly, the features of the disclosed embodiments should not be construed as limiting any aspect of the invention.

Figure 1:
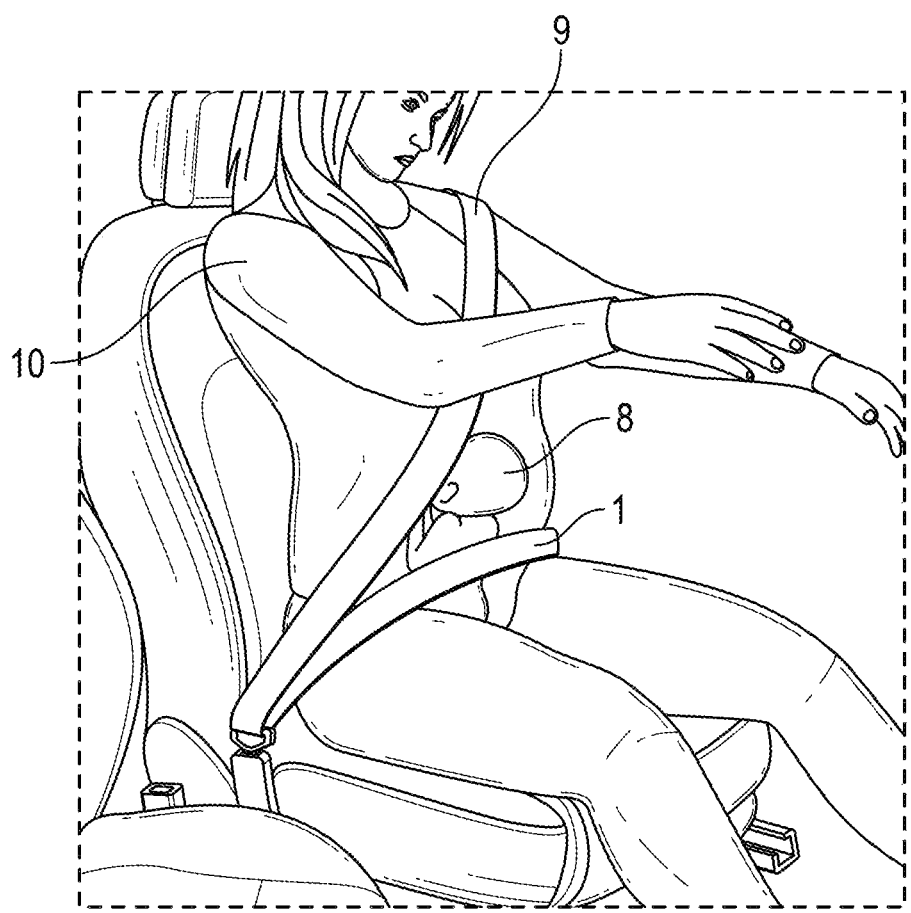
FIG. 1 illustrates a prior art seatbelt and the crushing effect upon an unborn baby in the event of an accident or rapid deceleration.
Figure 2:
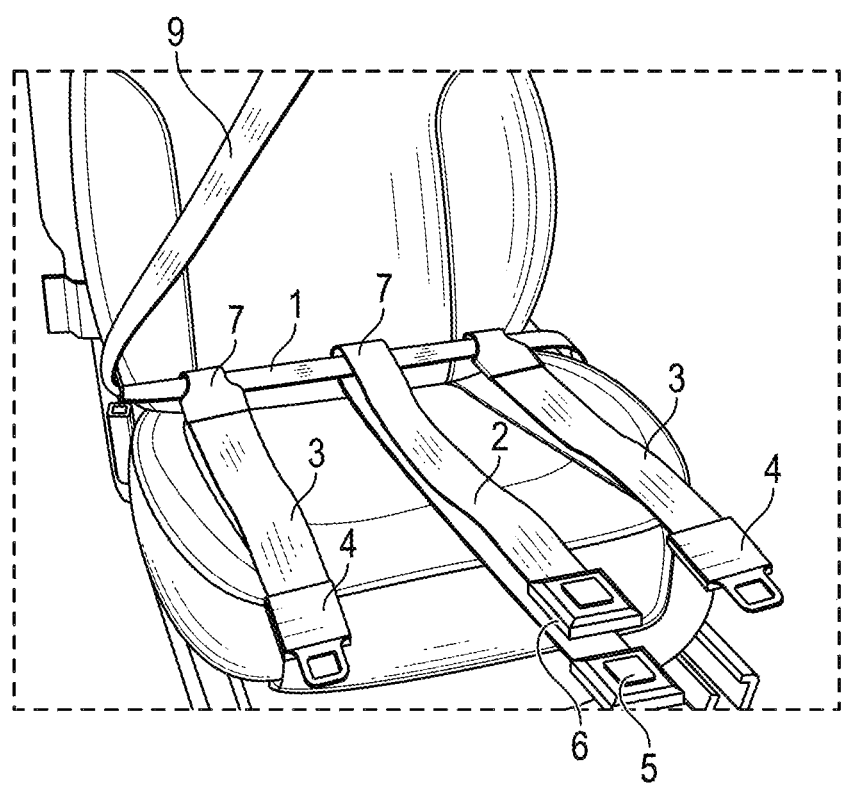
FIG. 2 illustrates a first embodiment incorporating aspects of the disclosure and coupling or installation of the embodiment to an existing prior art seat belt.

The pregnancy seatbelt embodiments described herein are adapted to be connected or coupled to an existing prior art seatbelt. As illustrated in FIG. 2, the embodiment includes a center belt 2 and left and right thigh-belts 3. The center belt 2 has a seat belt buckle 6 at a first end and a second end of the belt 2. The center belt 2 is looped over or around the prior art lap belt restraint 1 to secure the center belt 2 to the existing seat belt system installed in the vehicle. Also, each of the left and right thigh-belts 3 also have a loop 7 at first ends and a latch-plate 4 at second ends. The loops 7 at the first ends of the left and right thigh-belts 3 are also securable to the prior art lap belt restraint 1 installed in the vehicle by looping or knotting as suggested. In use, the center belt 2 is pulled up between the user's thighs and the left and right thigh-belts 3 pulled up around the user's outside left and right thighs and the latch-plates 4 of each thigh-belt buckled to the seat belt buckle 6 of the center belt 2.

Figure 3:
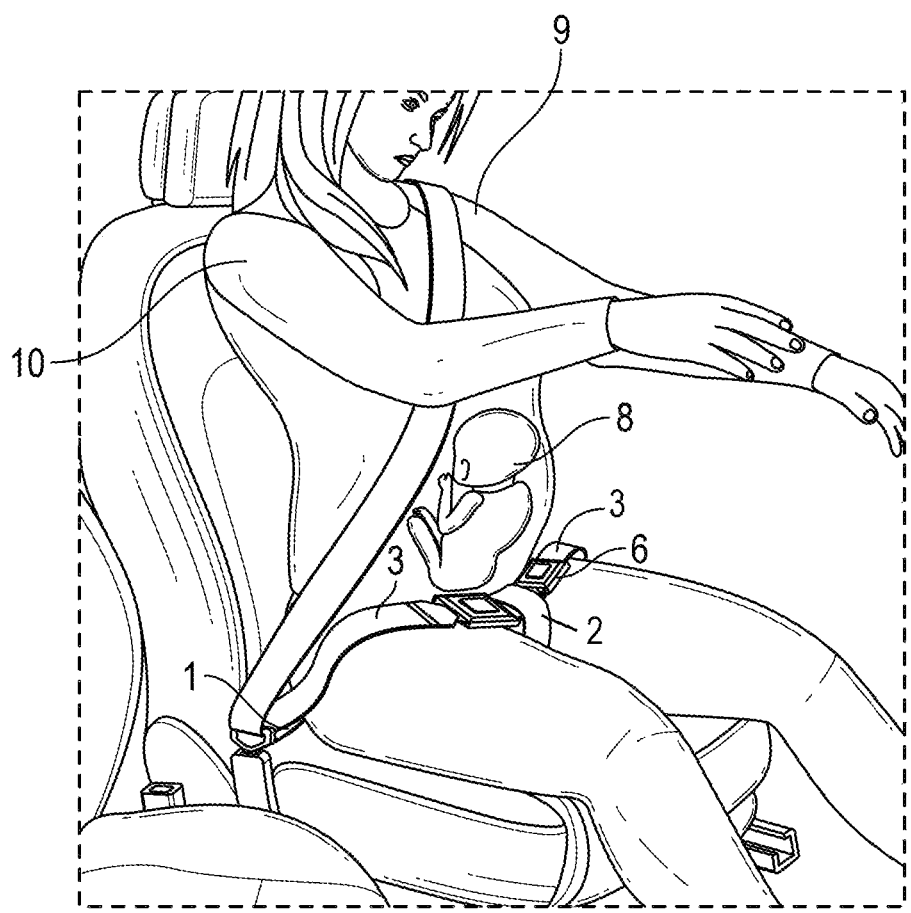
FIG. 3 illustrates use of an embodiment wherein the unborn baby 8 is protected by avoidance of a strap against the mother's abdomen.

An example of how the embodiments disclosed herein protect the unborn baby 8 without sacrificing safety to the expectant mother 10 is illustrated in FIG. 3. Left and right thigh-belts 3 that secure to a center belt 2 to secure the thighs of expectant mother 10 rather than her abdomen. As disclosed, herein the center belt 2 will have two seat belt buckle receptacles 6 for the latch-plates 4 of each thigh-belt 3 located on the sides of the seat belt buckle 6, which two seat belt buckle receptacles 6 may be implemented by any of the various embodiments herein (that use a center belt) for the same result.

Figure 4:
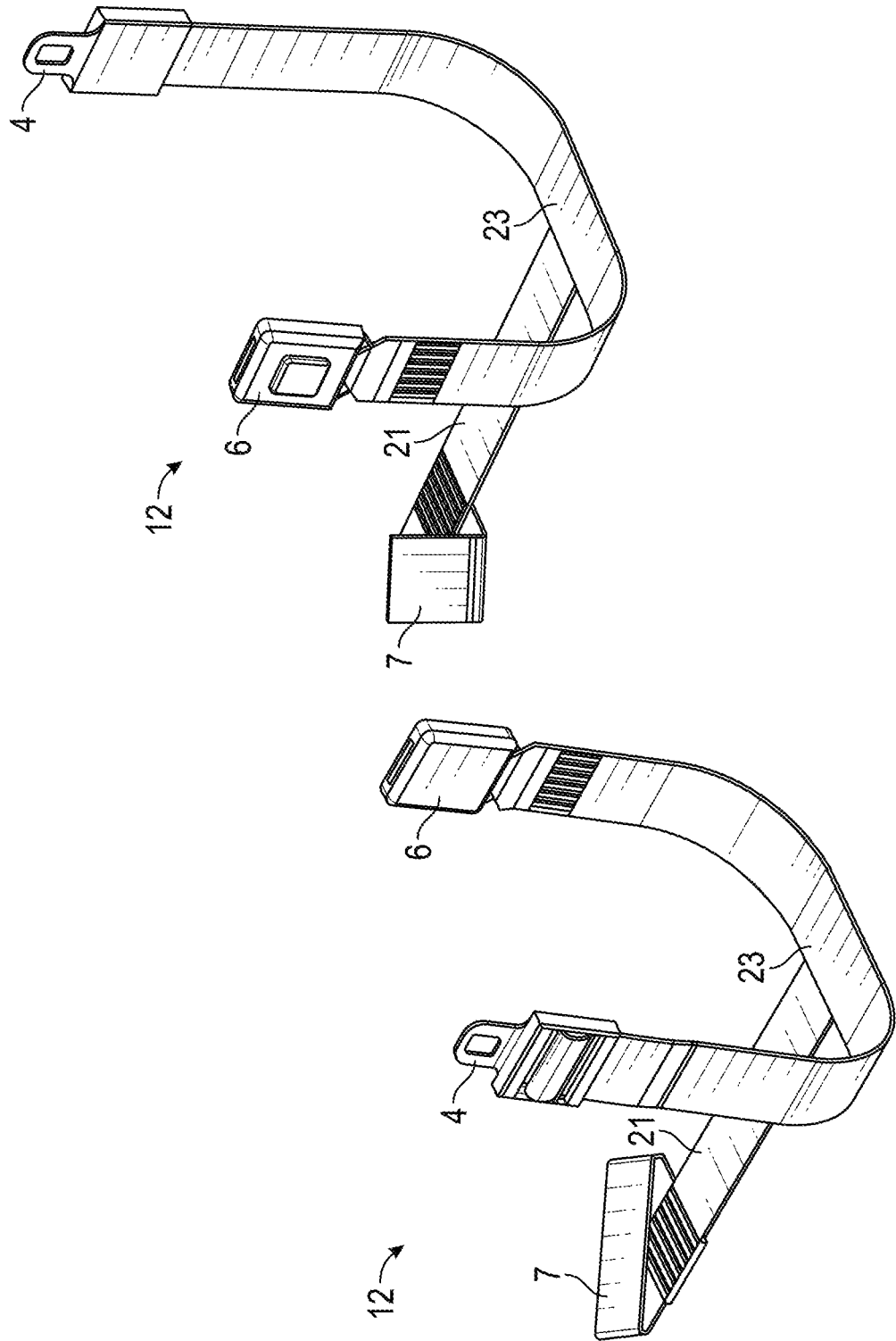
FIG. 4 illustrates left and right T-shaped buckled garter belts 12 of a second embodiment.
Figure 5A:
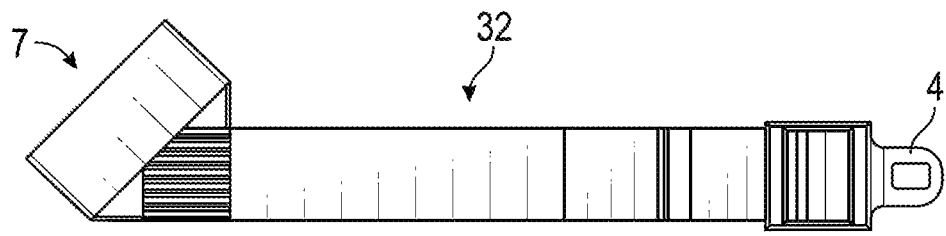
FIGS. 5A-5C illustrate the components of a third embodiment including a looped-middle-belt 14 and left and right thigh-belts 16.
Figure 5B:
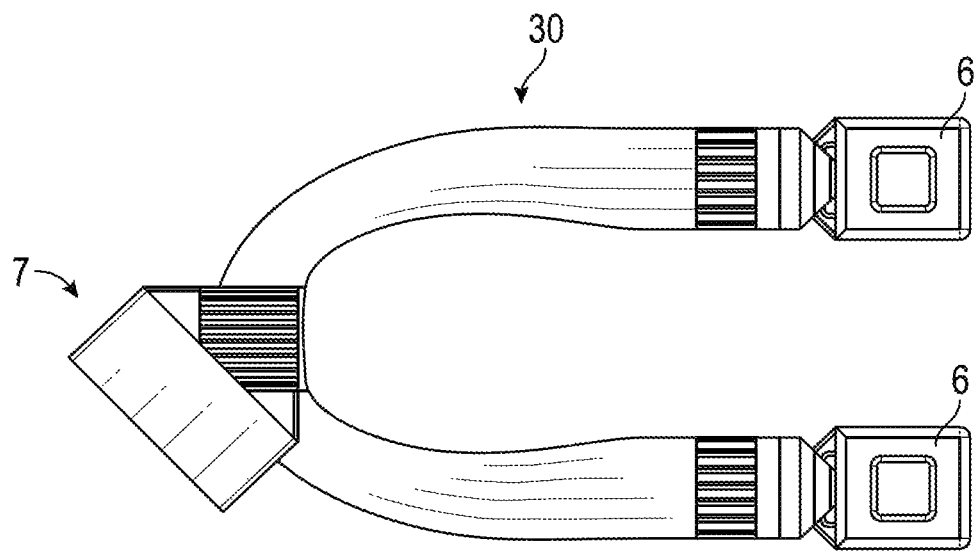
Figure 5C:
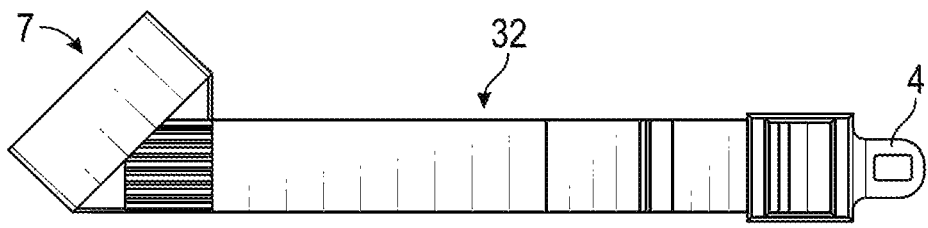
Figure 6A:
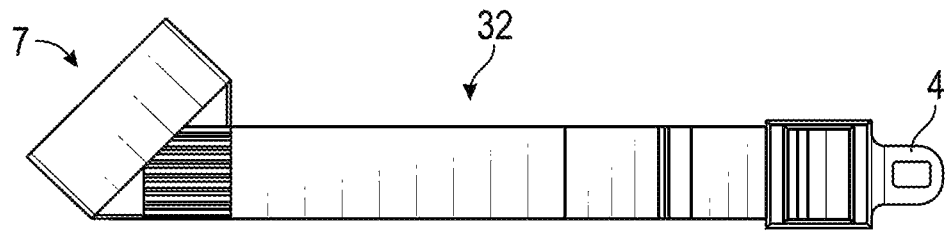
FIGS. 6A-6C illustrate the components of a fourth embodiment incorporating aspects of the disclosure.
Figure 6B:
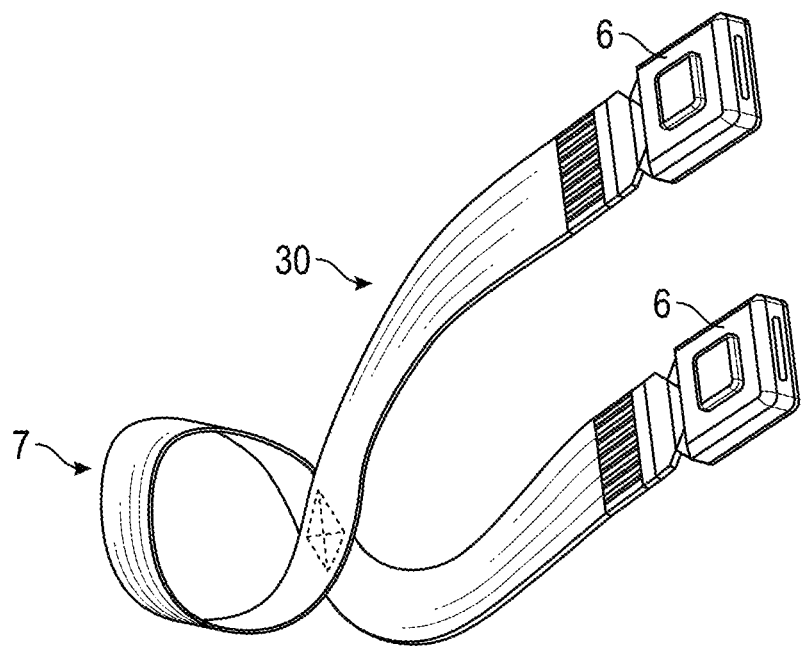
Figure 6C:
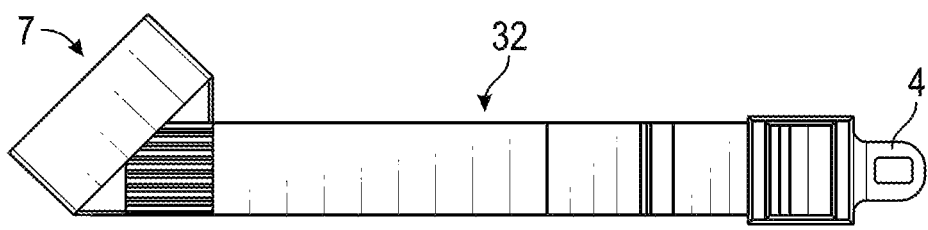
Figure 7A:
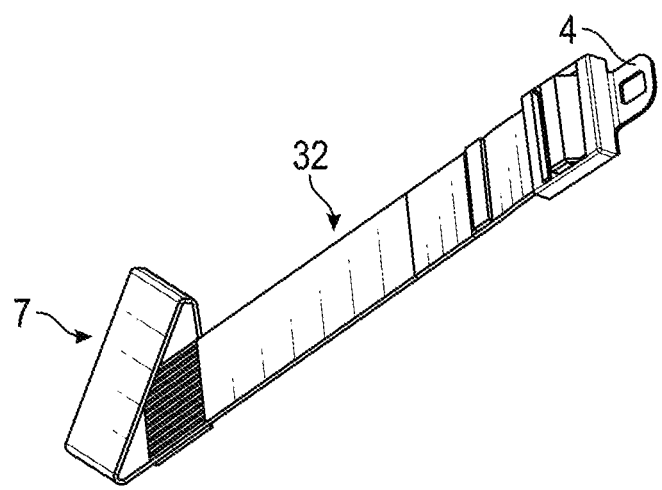
FIGS. 7A-7C illustrate the components of an alternate U-shaped double-buckled center belt 30 of the fourth embodiment incorporating aspects of the disclosure The objects, features and advantages of the present invention will be more readily appreciated upon reference to the following disclosure when considered in conjunction with the accompanying drawings, wherein reference numerals are used to identify the components in the various views.
Figure 7B:
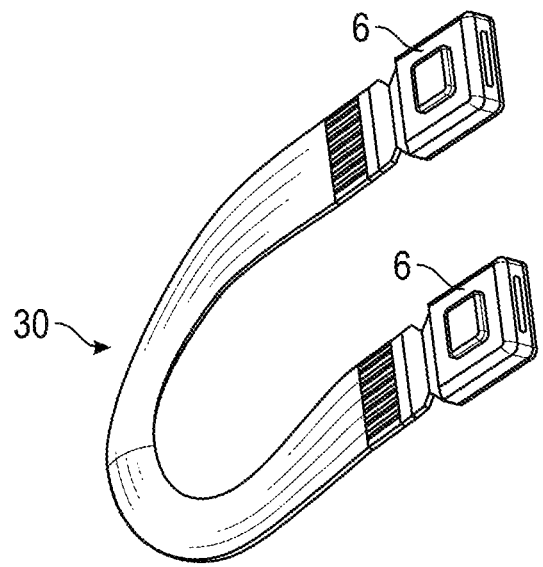
Figure 7C:
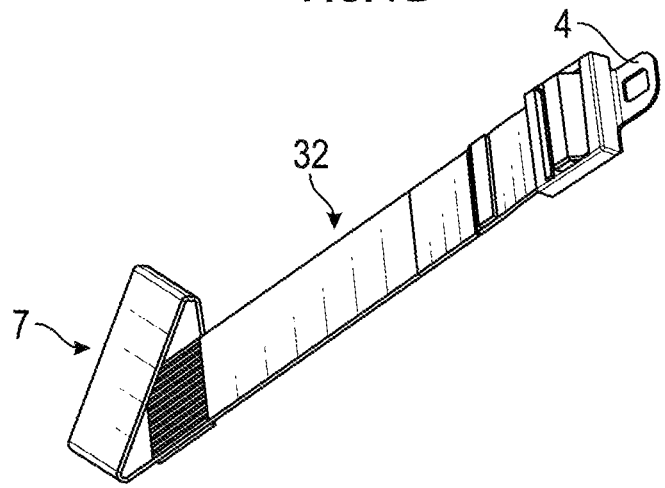

FIGS. 4A-4C illustrate a second embodiment comprised of left and right T-shaped buckled garter belts 12. Each of the T-shaped buckled garter belts 12 comprise a center segment 21 and a thigh-loop segment 23. The T-shaped buckled garter belts 12 have a loop 7 at a first end and is connected to the thigh-loop segment 23 at the second end, and preferably at a substantially perpendicular angle. The loops 7 again may be secured to the lap belt restraint 1 by a knot as previously disclosed. Moreover, as illustrated, the loop 7 at each end of the center segment 21 may be connected at a diagonal angle relative to the center segment 21 or via a straight loop orthogonal to the vehicle's existing lap belt 1, rather than an angled loop, FIGS. 5A-5C illustrate a third embodiment comprising a substantially U-shaped double-buckled center belt 30 and left and right thigh-straps 32. In the preferred third embodiment, the left and right thigh-straps 32 have a loop 7 on a first end and a latch-plate 4 on the second end, and the U-shaped double-buckled center belt 30 has a loop 7 centered in the center of the "U" and seat belt buckles 6 at the second ends of the U-shape. Of course, it is to be understood that the seat belt buckles 6 for any of the embodiments with a center belt could be located at the ends of the left and right thigh-straps 32 and latch-plates 4 connected at the second ends of the U-shaped center belt to create a U-shaped double latch-plate center belt (not illustrated). Installation of the embodiment comprises attachment of component of the pregnancy seat belt using the loops 7 of each component to secure each component to the lap belt restraint 1 with the U-shaped double-buckled center belt 30 and the left and right thigh-straps 32 situated to the sides of the user and the U-shaped double-buckled center belt 30 pulled up between the user's thighs and the left and right thigh-straps 32 pulled over the top of the user's upper thighs at or near the hip-creases and buckled to the U-shaped double-buckled center belt 30. FIGS. 6A-6C illustrate a variation of the third embodiment wherein the U-shaped double-buckled center belt 30 includes a loop 7 formed by crossing the seat belt strap material of the U-shaped double-buckled center belt 30 and stitching the layers of seat belt strap material at the intersection or overlap. FIGS. 7A-7C illustrate still another variation of the third embodiment wherein the U-shaped double-buckled center belt 30 does not incorporate a loop 7 in the center of the "U" and the U-shaped double-buckled center belt 30 but still may be connected to the lap belt restraint 1, such as was previously disclosed by a lark's head knot.

While various embodiments have been described above, it should be understood by a person of ordinary skill in the art that the description has been presented by way of example only, and not limitation. Thus, the breadth and scope of the claims or a preferred embodiment should not be limited by any of the above-described exemplary embodiments but should be defined only in accordance with the following claims and their equivalents.

The invention claimed is:

1. A pregnancy seat belt, comprising:
a length of seat belt strap material with a seat belt buckle on each end of the length; and
left and right thigh-belts, each left and right thigh-belt with a loop on first ends and a latch-plate on the second ends;
wherein the length of seat belt strap material and the left and right thigh-belts are securable to a lap belt restraint of an existing seat belt installed in a vehicle and the latch-plates are securable to the seat belt buckles over the thighs of an expectant mother.

2. A pregnancy seat belt, comprising:
left and right T-shaped garters of seat belt strap material, the T-shaped garters comprised of a center segment with a loop at a first end of the center segment and that intersects a thigh-loop segment at a second end of the center segment, the thigh-loop segments with a seat belt buckle and a latch-plate at opposite ends of the thigh-loop segments, the loop at each first ends is securable to a lap belt restraint by the loops at the first ends of the center segments around the lap belt restraint and threading the first ends through the loops.

3. The pregnancy seat belt in claim 2 wherein, the loops on the first ends of the center segments are oriented diagonally relative to the center segment.

4. A pregnancy seat belt, comprising:
a U-shaped double buckled center belt of seat belt strap material, with a seat belt buckle on each end of the U-shaped double buckled center belt; and
left and right thigh-straps with loops at the first ends and latch plates at second ends of the left and right thigh-straps;
wherein the U-shaped double buckled center belt is securable by a knot to a lap belt restraint and the left and right thigh-straps are securable to the lap belt restraint by the loops and the U-shaped seat belt buckle center belt may be pulled up between the thighs of an expectant mother and the latch plates of the left and right thigh-straps securable to each of the seat belt buckles of the U-shaped double seat belt buckle center belt.

5. The pregnancy seat belt in claim 4 wherein, the U-shaped double buckled center belt has a loop at a middle portion securable to a lap belt restraint.

6. The pregnancy seat belt in claim 5 wherein, the loop at the middle portion includes a stitched overlap of seat belt strap material layers.

* * * * *